June 29, 1937.　　　　J. L. TUTTLE ET AL　　　　2,085,345
WEIGHING MECHANISM
Filed Dec. 12, 1936
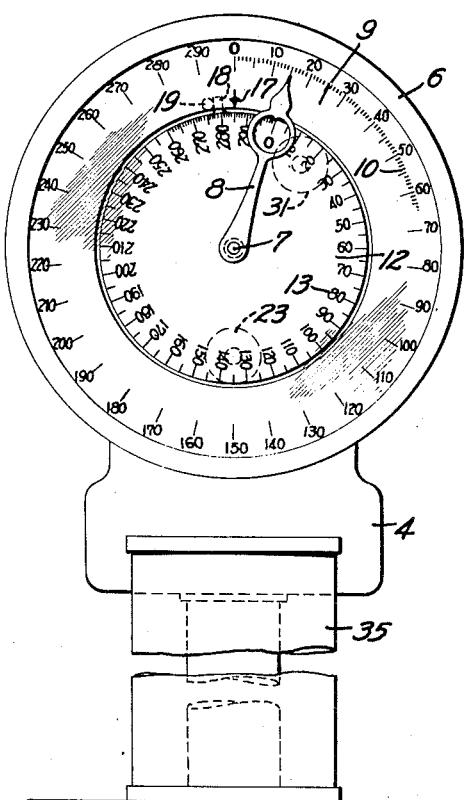
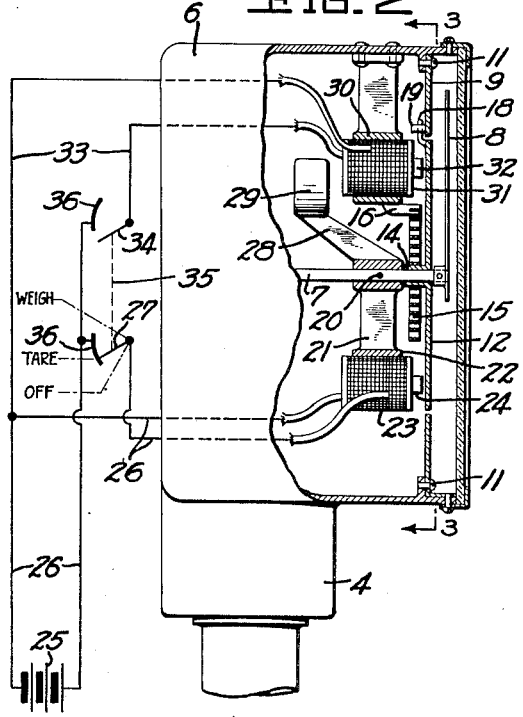
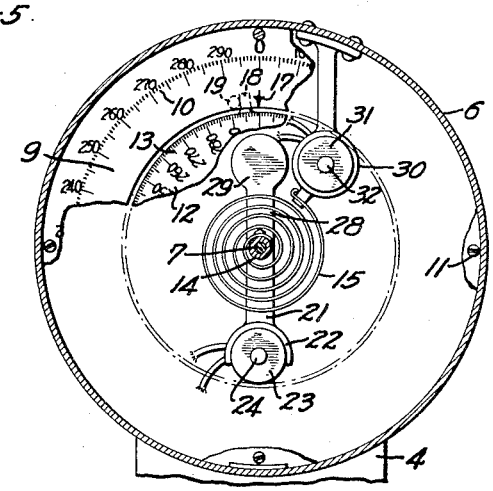
INVENTORS
JESS L. TUTTLE
HARRY C. SCHROEDER
BY
　　　　　　ATTORNEY.

Patented June 29, 1937

2,085,345

UNITED STATES PATENT OFFICE 2,085,345

WEIGHING MECHANISM

Jess L. Tuttle and Harry C. Schroeder, Oakland, Calif.

Application December 12, 1936, Serial No. 115,546

10 Claims. (Cl. 265—27)

Our invention relates generally to the dial type of weighing apparatus and particularly to means whereby, when filling containers, the net weight thereof may be readily and quickly ascertained.

It is an important object of our invention to provide a weighing mechanism which will automatically, by placing a container thereon, set the mechanism to the tare weight thereof, and thereafter indicate only the net weight of the container contents.

Other objects of our invention are to provide a weighing mechanism in which the tare weight of a container or the like, cannot be erroneously indicated; to provide means, in a weighing mechanism, which will automatically adjust itself to difference in the tare weights of containers; to provide a distinct improvement in the mechanism of weighing apparatus for the use above described, and to provide, in combination with the present known mechanisms of weighing scales, means for expeditiously determining and setting the individual tare weights of containers of variable weights and thereafter, after filling the containers, indicating the net weight of said contents.

There are, in present use, various types of weighing scales equipped with movable dials by means of which the tare weight of such articles as containers may be deducted, prior to the filling thereof, so that the resultant reading on the dial is indicative of the net weight only of the contents of the container.

As a rule, particularly in the dial type of scale, the dial is rotatably adjustable about the axis of rotation of the indicator, so that by placing an empty container on the scale and moving the zero point of the dial, to coincide with the advanced position of the indicator, the scale will then directly indicate the weight of any quantity of material placed in the container without the necessity of mentally or otherwise subtracting the tare weight thereof after filling.

Such an arrangement would operate satisfactorily if the tare weight of each container were constant. However, in sizable containers, or such articles as steel drums for fluids, the tare weight may vary as much as several pounds, thereby necessitating manual setting of the weight at each filling. This, it will be seen, seriously impedes production and, due to the human factor involved, invites errors which under the rigid weights and measures laws, are liable to prove costly.

We have provided mechanism for scales of the type described, which deducts, expeditiously and without error, the tare weights of containers and indicates thereafter the weights of the contents thereof without the necessity of manual adjustments of any kind on the scale dial.

One form of our invention is illustrated in the drawing in which:

Figure 1 is a front elevation of a dial scale incorporating our invention,

Figure 2 is a side elevation of the device of Figure 1, parts thereof being broken away and others thereof being shown in section to disclose the construction more clearly, and Figure 3 is a vertical sectional view taken in a plane indicated by the line 3—3 of Figure 2.

In greater detail the mechanism of our invention may be adapted to be included in the type of scale shown in Figure 1 which is well known in the art, the standard 4 having the weighing platform 5 at its lower end and the dial housing 6 mounted at its upper end. The shaft 7, which is positioned axially of the housing 6, is connected through well known mechanism with the platform 5 and is adapted to rotate in accordance with the weight of an object placed upon the latter. An indicating pointer 8 is fixed to the shaft 7 for rotation therewith.

A fixed dial 9, having indicia 10 on the surface thereof, is mounted by suitable screws 11 in the housing 6, and a second dial 12, made of ferrous material, also having indicia 13 adjacent its periphery, is mounted for rotation on the shaft 7 by means of the bearing 14. The positions of the two dials is such that their faces carrying the indicia lie in planar alinement.

A helical spring 15, having its inner end secured to the bearing 14 and its outer end to a bracket 16, depending from the housing 6, is provided for returning the zero point of the dial 12 to alinement with the arrow 17, of the dial 9, when the first dial is rotated clockwise, and a lug 18 cooperating with a stop pin 19 is provided for preventing rotation of the dial 12 counterclockwise past the position indicated.

Means are provided for connecting the dial 12 and the shaft 7 for rotation together and means are also provided for preventing continued rotation thereof together.

Secured for rotation with the shaft 7, by means of the pin 20, is an arm 21, terminating in a substantially tubular portion 22 which carries a solenoid 23 having an iron core or armature 24 positioned closely adjacent the inner face of the dial 12. Energizing means for the solenoid are provided by a current source 25 through leads 26, one of which is provided with a switch 27 for permitting optional energization or de-energization of the solenoid. The current source may conveniently be one or a plurality of so-called "dry cells" since the solenoid is designed to consume a minimum of current. To compensate for the weight of the arm 21 and that of the solenoid 23, an arm 28, having thereon a counterweight 29, is provided diametrically opposite the first two elements.

The bracket 16 has also formed at the end thereof a tubular portion 30 which serves to support a second or fixed solenoid 31 also provided with an armature 32 which is positioned adjacent the inner surface of the dial 12. Leads 33 connect this solenoid with the source 25 through a connecting switch 34.

In operation, before placing an empty container 35 on the platform 5, the switch 27 is closed thus energizing the solenoid 23. Due to the positioning of the ferrous dial 12, within the magnetic field of the armature 24, the former will be attracted into adherent contact with the armature. The container 35 is now placed on the platform which causes the shaft 7 and the pointer 8 to rotate and due to the connection of the armature 24 with the dial 12, the latter rotates a corresponding amount. Thus the zero point of the dial has been carried around clockwise a distance corresponding to the weight of the container.

This operation having been performed, the switch 34 is now closed and immediately thereafter the switch 27 is opened. This causes energization of the solenoid 31 which attracts the dial 12 as did the solenoid 23 and due to its fixed position holds the dial in its displaced relationship with the arrow 17. Since the solenoid 23 is now de-energized there exists no connection between the shaft 7 and the dial 12 and since such is the case it will be seen that additional weight placed in the container will cause the pointer 8 to move independently of the dial and by such movement, beyond the displaced position of the zero point of the dial, register only the weight of the material placed in the container.

Before a second container is placed on the platform, the switch 34 is opened which de-energizes the solenoid 31 and allows the dial 12 to rotate back against the stop 19 urged by the spring 15. The switch 27 is again closed, a new container is placed on the platform and the cycle of operations is repeated.

The reason for de-energizing the solenoid 31, and clearing the dial 12 between each weighing operation, is to reset the tare weight for each container, should, due to differences in size or design, the weights thereof vary.

To simplify the operation of the switches 27 and 34 it is contemplated to connect them with a link 35 and each switch with an arcuate contact 36. It will be seen that when the switch 27 is at the "off" position, both switches are open. When the switch 27 is moved to the position marked "tare" it alone is closed and the scale is set to register the tare weight of the container. After the container has been placed on the scale platform, the switch is moved to the "weigh" position whereupon the dial 12 is locked and the connection between the dial and the pointer is broken permitting continued movement of the latter to indicate the net weight.

It will be observed that there is a slight projection of each contact 36 beyond the midpoint of the travel of the switch arms. This projection is provided to insure that there is no instant during the transfer of energy from the solenoid 23 to the holding solenoid 31 when the latter is de-energized thereby permitting return of the dial 12 to the zero point.

From the above description it will be seen that we have provided improved mechanism whereby the tare weights of containers or the like are automatically set on a scale by the simple operation of placing the container on the scale platform and the equally simple operation of throwing a switch to a plainly marked position. Since the requirement that an auxiliary dial be set manually is eliminated, so also is the source of error incident to the presence of the human factor in weighing operations performed on the majority of the scales in present use.

We claim:

1. A weighing scale comprising an indicator movable in accordance with the weight of an object placed on said scale, a dial having indicia thereon disposed in cooperative relationship with said indicator and movable therewith, means for connecting said dial and said indicator for movement together during part of the movement of said indicator, and means for preventing continued movement of said dial and said indicator together.

2. A weighing scale comprising an indicator movable in accordance with the weight of an object placed on said scale, a dial having indicia thereon disposed in cooperative relationship with said indicator and movable therewith, magnetic means for connecting said dial and said indicator for movement together during part of the movement of said indicator, and means for preventing continued movement of said dial and said indicator together.

3. A weighing scale comprising an indicator movable in accordance with the weight of an object placed on said scale, a dial having indicia thereon disposed in cooperative relationship with said indicator and movable therewith, magnetic means for connecting said dial and said indicator for movement together during part of the movement of said indicator, and magnetic means for preventing continued movement of said dial and said indicator together.

4. In a weighing scale comprising mechanism including a shaft rotatable in accordance with the weight of an object placed on said scale, a dial having indicia thereon rotatably mounted on said shaft, a pointer fixed for rotation with said shaft and disposed in cooperative relationship with said indicia, means carried on said shaft for connecting said shaft and dial for rotation together and means for preventing continued rotation thereof together.

5. In a weighing scale comprising mechanism including a shaft rotatable in accordance with the weight of an object placed on said scale, a dial having indicia thereon rotatably mounted on said shaft, a pointer fixed for rotation with said shaft and disposed in cooperative relationship with said indicia, an arm secured to said shaft and extending radially therefrom to a position adjacent said dial, electro-magnetic means on said arm for connecting said arm and dial for rotation together, and means for energizing said electro-magnetic means.

6. In a weighing scale comprising mechanism including a shaft rotatable in accordance with the weight of an object placed on said scale, a dial having indicia thereon rotatably mounted on said shaft, a pointer fixed for rotation with said shaft and disposed in cooperative relationship with said indicia, an arm secured to said shaft and extending radially therefrom to a position adjacent said dial, electro-magnetic means on said arm for connecting said arm and dial for rotation together, said means comprising an armature mounted on said arm and positioned closely adjacent said dial near the periphery thereof, an energizing coil disposed about said armature and means for energizing and de-energizing said coil.

7. In a weighing scale comprising mechanism including a shaft rotatable in accordance with the weight of an object placed on said scale, a dial having indicia thereon rotatably mounted on said shaft, a pointer fixed for rotation with said shaft and disposed in cooperative relationship with said indicia, a fixed element, means carried on said shaft for connecting said shaft and dial for rotation together, and means for connecting together said dial and said fixed element.

8. In a weighing scale comprising mechanism including a shaft rotatable in accordance with the weight of an object placed on said scale, a dial having indicia thereon rotatably mounted on said shaft, a pointer fixed for rotation with said shaft and disposed in cooperative relationship with said indicia, a fixed element, electro-magnetic means mounted on said fixed element and having an armature disposed adjacent said dial, electro-magnetic means, having an armature disposed adjacent said dial, mounted on said shaft for rotation therewith, and means for selectively energizing said electro-magnetic means.

9. In a weighing scale including a shaft rotatable in accordance with the weight of an object placed on said scale and a fixed housing disposed around said shaft, a dial rotatably mounted on said shaft and having indicia thereon, an indicator mounted for rotation with said shaft and movable over the face of said dial in cooperative relationship with said indicia, an arm mounted for rotation with said shaft, an armature carried by said arm and disposed adjacent said dial, an energizing coil on said armature, an armature mounted on said fixed housing and disposed adjacent said dial, an energizing coil on said armature, and means for selectively energizing said coils.

10. The combination in a weighing scale comprising a shaft rotatable in accordance with the weight of an object placed on said scale, a dial journaled on said shaft and having indicia thereon, and an indicator rotatable with said shaft in cooperative relationship with said indicia to indicate the weight of said object, of means for connecting said dial and said indicator for movement together during part of the movement of the latter, and means for preventing continued movement thereof together.

JESS L. TUTTLE.
HARRY C. SCHROEDER.